(12) United States Patent
Jarvis et al.

(10) Patent No.: US 12,244,916 B2
(45) Date of Patent: *Mar. 4, 2025

(54) PORTABLE ELECTRONIC DEVICE

(71) Applicant: Apple Inc., Cupertino, CA (US)

(72) Inventors: Daniel W. Jarvis, Sunnyvale, CA (US); Michael D. Quinones, Campbell, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/467,548

(22) Filed: Sep. 14, 2023

(65) Prior Publication Data

US 2024/0007729 A1 Jan. 4, 2024

Related U.S. Application Data

(63) Continuation of application No. 17/932,760, filed on Sep. 16, 2022, now Pat. No. 11,792,498, which is a (Continued)

(51) Int. Cl.
*H04N 23/54* (2023.01)
*G06F 1/16* (2006.01)
(Continued)

(52) U.S. Cl.
CPC ........... *H04N 23/54* (2023.01); *G06F 1/1684* (2013.01); *G06F 1/1686* (2013.01);
(Continued)

(58) Field of Classification Search
CPC ........ H04N 23/54; H04N 23/45; H04N 23/50; H04N 23/51; H04N 23/55; H04N 23/56;
(Continued)

(56) References Cited

U.S. PATENT DOCUMENTS

| 7,683,962 B2 | 3/2010 | Border et al. |
| 7,859,588 B2 | 12/2010 | Parulski et al. |

(Continued)

FOREIGN PATENT DOCUMENTS

| CN | 102914941 A | 2/2013 |
| CN | 204644191 U | 9/2015 |

(Continued)

OTHER PUBLICATIONS

Chinese Patent for Utility Model No. ZL201820137753.0—Utility Model Patent Evaluation Report (UMPER) dated Dec. 20, 2018.

(Continued)

*Primary Examiner* — Abdelaaziz Tissire
(74) *Attorney, Agent, or Firm* — Dorsey & Whitney LLP

(57) ABSTRACT

Portable electronic devices having I/O assemblies that can include optical and audio components are described. An exemplary I/O assembly can include a first camera module and a second camera module that can be carried within a camera module housing. A flex connector can carry a strobe that can be positioned between the first camera module and the second camera module. A trim can enclose the first camera, the second camera and the strobe and optically isolates the optical components. An exemplary portable electronic device can include a side wall retainer that defines its perimeter, a front cover glass and a rear cover glass that cooperate to form an enclosure. The I/O assembly can be secured to the enclosure both from inside and outside of the rear cover glass. I/O assembly can also include an audio transducer that can record sound when the camera module are recording videos.

20 Claims, 13 Drawing Sheets

Related U.S. Application Data continuation of application No. 17/129,174, filed on Dec. 21, 2020, now Pat. No. 11,477,355, which is a continuation of application No. 16/532,237, filed on Aug. 5, 2019, now Pat. No. 10,904,412, which is a continuation of application No. 15/826,400, filed on Nov. 29, 2017, now Pat. No. 10,425,561.

(60) Provisional application No. 62/556,190, filed on Sep. 8, 2017.

(51) Int. Cl.
    *H04M 1/02*         (2006.01)
    *H04N 23/45*        (2023.01)
    *H04N 23/50*        (2023.01)
    *H04N 23/51*        (2023.01)
    *H04N 23/55*        (2023.01)
    *H04N 23/56*        (2023.01)
    *H04N 23/57*        (2023.01)

(52) U.S. Cl.
    CPC .......... *H04M 1/0264* (2013.01); *H04N 23/45* (2023.01); *H04N 23/50* (2023.01); *H04N 23/51* (2023.01); *H04N 23/55* (2023.01); *H04N 23/56* (2023.01); *H04N 23/57* (2023.01); *H04R 2499/11* (2013.01)

(58) Field of Classification Search
    CPC ..... H04N 23/57; G06F 1/1684; G06F 1/1686; G06F 1/1656; H04M 1/0264; H04R 2499/11
    See application file for complete search history.

(56) References Cited

U.S. PATENT DOCUMENTS

| | | | |
|---|---|---|---|
| 7,927,028 | B2 | 4/2011 | Chan |
| 9,469,469 | B2 | 10/2016 | Rayner |
| 9,639,935 | B1 | 5/2017 | Douady-Pleven et al. |
| 9,718,249 | B2 | 8/2017 | Kwong |
| 10,218,830 | B1 | 2/2019 | Liu et al. |
| 10,425,561 | B2 | 9/2019 | Jarvis et al. |
| 10,574,802 | B2 | 2/2020 | Chen et al. |
| 10,701,250 | B2 | 6/2020 | Jarvis et al. |
| 10,904,412 | B2 | 1/2021 | Jarvis et al. |
| 11,477,355 | B2 * | 10/2022 | Jarvis ................ H04N 23/56 |
| 2005/0275748 | A1 | 12/2005 | Takekuma et al. |
| 2009/0161215 | A1 | 6/2009 | Chan |
| 2010/0157141 | A1 | 6/2010 | Ouyang |
| 2010/0277819 | A1 | 11/2010 | Ouyang |
| 2011/0050986 | A1 | 3/2011 | Wang |
| 2011/0255000 | A1 * | 10/2011 | Weber ................ B23K 26/351 |
| | | | 219/121.72 |
| 2012/0229700 | A1 | 9/2012 | Hsiung |
| 2013/0033581 | A1 * | 2/2013 | Woo ................ G06F 1/1626 |
| | | | 348/47 |
| 2013/0162894 | A1 | 6/2013 | Lee |
| 2014/0028902 | A1 | 1/2014 | Sanford et al. |
| 2014/0063265 | A1 | 3/2014 | Shukla et al. |
| 2014/0313430 | A1 | 10/2014 | Bui et al. |
| 2015/0002734 | A1 | 1/2015 | Lee |
| 2015/0044816 | A1 | 2/2015 | Kim et al. |
| 2015/0049191 | A1 | 2/2015 | Scalisi et al. |
| 2015/0190094 | A1 * | 7/2015 | Lee ................ A61B 5/6898 |
| | | | 600/479 |
| 2015/0198864 | A1 | 7/2015 | Havskjold et al. |
| 2016/0028931 | A1 | 1/2016 | Kwong et al. |
| 2016/0061653 | A1 | 3/2016 | Chang et al. |
| 2016/0062213 | A1 | 3/2016 | Rammah et al. |
| 2016/0329628 | A1 * | 11/2016 | Kim ................ H01Q 1/243 |
| 2017/0082823 | A1 | 3/2017 | Hwang et al. |
| 2017/0085764 | A1 * | 3/2017 | Kim ................ H04N 23/63 |
| 2017/0094222 | A1 | 3/2017 | Tangeland et al. |
| 2017/0104901 | A1 | 4/2017 | Sanford et al. |
| 2017/0245370 | A1 * | 8/2017 | Wang ................ B29C 45/14639 |
| 2018/0091712 | A1 * | 3/2018 | Lee ................ G01J 1/4204 |
| 2018/0176350 | A1 | 6/2018 | Wei et al. |
| 2018/0176426 | A1 * | 6/2018 | Wei ................ A61B 3/154 |
| 2018/0241861 | A1 * | 8/2018 | Kim ................ H04M 1/18 |
| 2019/0020830 | A1 * | 1/2019 | Zhou ................ G06F 21/32 |
| 2019/0094920 | A1 | 3/2019 | Qiu et al. |
| 2019/0223310 | A1 | 7/2019 | Wright et al. |
| 2021/0112184 | A1 | 4/2021 | Jarvis et al. |
| 2023/0020199 | A1 | 1/2023 | Jarvis et al. |

FOREIGN PATENT DOCUMENTS

| | | |
|---|---|---|
| CN | 106094394 A | 11/2016 |
| CN | 107124537 A | 9/2017 |
| EP | 2555526 A2 | 2/2013 |
| EP | 2779597 A2 | 9/2014 |
| KR | 100757448 B1 | 9/2007 |
| KR | 20170048064 A | 5/2017 |
| KR | 20170096453 A | 8/2017 |
| KR | 20170104901 A | 9/2017 |
| WO | 2014088469 A1 | 6/2014 |

OTHER PUBLICATIONS

European Search Report for EP Application No. 22204533.8, mailed Feb. 10, 2023 (9 pp.).
PCT Patent Application No. PCT/US2018/014784—International Search Report and Written Opinion dated Jun. 7, 2018.
PCT Patent Application No. PCT/US2018/045657—International Search Report and Written Opinion dated Nov. 30, 2018.
Ekaterina Buravich , "Overview of smartphone Lumigon T3: 100 "horses" in the Ferrari", https://newsworld.co/overview-of-smartphone-lumigon-t3-100-horses-in-the-ferrari/, Sep. 14, 2017, 28 Pgs.
Smith, Chris , "New iPhone 8 schematics leak offers several exciting revelations", Retrieved from the Internet: <URL:https://bgr.com/2017/04/24/iphone-8-rumors-schematics-leaks></URL:> Apr. 24, 2017.
Extended European Search Report for European Patent Application No. 24188881.7 dated Nov. 11, 2024.

\* cited by examiner

PORTABLE ELECTRONIC DEVICE

CROSS-REFERENCE TO RELATED APPLICATIONS

The present application is a continuation of U.S. patent application Ser. No. 17/932,760, filed Sep. 16, 2022, entitled "PORTABLE ELECTRONIC DEVICE", which is a continuation of U.S. patent application Ser. No. 17/129,174, entitled "PORTABLE ELECTRONIC DEVICE," filed Dec. 21, 2020, now U.S. Pat. No. 11,477,355, issued Oct. 18, 2022, which is a continuation of U.S. patent application Ser. No. 16/532,237, entitled "PORTABLE ELECTRONIC DEVICE," filed Aug. 5, 2019, now U.S. Pat. No. 10,904,412, issued Jan. 26, 2021, which is a continuation of U.S. patent application Ser. No. 15/826,400, entitled "PORTABLE ELECTRONIC DEVICE," filed Nov. 29, 2017, now U.S. Pat. No. 10,425,561, issued Sep. 24, 2019, which claims the benefit of U.S. Provisional Application No. 62/556,190, entitled "PORTABLE ELECTRONIC DEVICE," filed Sep. 8, 2017, the contents of which are incorporated herein by reference in their entireties for all purposes.

FIELD

Described embodiments can relate to portable electronic devices. More specifically, described embodiments can relate to a portable electronic device having an input/output (I/O) assembly.

BACKGROUND

As portable electronic devices continue to include increasingly greater numbers of features, integration of those features into a single device becomes increasingly complex. One particular feature that has become ubiquitous in popular portable electronic devices is imaging operations enabled by camera modules. Because camera modules can include fragile components such as lens and electronics, proper mounting of a camera module is important to protect the components from damage. Furthermore, improper alignment of the camera module with a portable electronic device can result in unexpected or even degraded imaging performance.

SUMMARY

This paper describes various exemplary input/output assemblies for portable electronic devices and methods of manufacturing and assembling portable electronic devices.

According to one embodiment, a portable electronic device is described. The portable electronic device can include an enclosure having a back wall. The portable electronic device can also include an input/output (I/O) assembly carried by the back wall. The I/O assembly can include a first camera module, a second camera module, a strobe module positioned between the first camera module and the second camera module. The I/O assembly can also include an audio transducer positioned adjacent to the strobe module. The audio transducer can detect audible signals.

According to another embodiment, a portable electronic device is described. The portable electronic device can include a display assembly that can present visual content. The portable electronic device can also include a front cover glass overlying the display assembly and a rear cover glass having an opening. The portable electronic device can also include a side wall retainer that can carry the front and rear cover glass and an I/O assembly positioned at the opening. The I/O assembly can include a first camera module, a second camera module, and a strobe module positioned between the first camera module and the second camera module. The I/O assembly can be secured to the rear cover glass and the side wall retainer.

According to yet another embodiment, a method for mounting an I/O assembly to a rear cover glass of a portable electronic device is described. The rear cover glass can have an opening and can be secured to a side wall retainer of the portable electronic device. The method can include securing the I/O assembly to a brace piece. The method can also include inserting the I/O assembly through the opening such that a portion of the I/O assembly protrudes from an exterior surface of the rear cover glass and the brace piece is positioned interior to the rear cover glass. The method can further include securing the brace piece to the side wall retainer. The method can further include connecting the portion of the I/O assembly and the exterior surface together by a turret that surrounds the portion of the I/O assembly.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
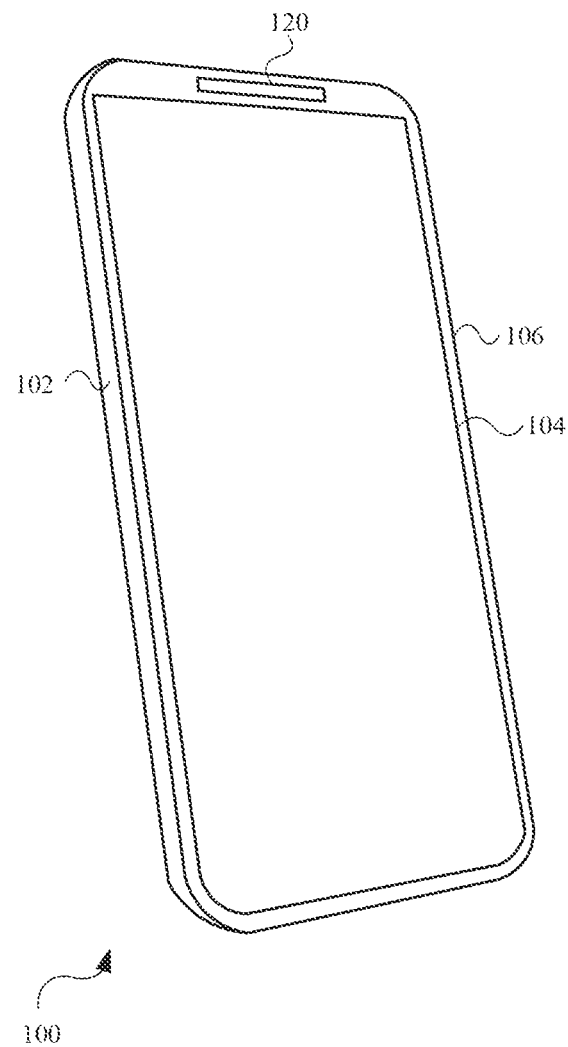
FIG. 1A is a front perspective view of a portable electronic device in accordance with some embodiments.

Those skilled in the art will appreciate and understand that, according to common practice, various features of the drawings discussed below are not necessarily drawn to scale, and that dimensions of various features and elements of the drawings can be expanded or reduced to more clearly illustrate the embodiments of the present invention described herein.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; other embodiments may be used, and changes may be made without departing from the spirit and scope of the described embodiments.

Embodiments described herein relate to input/output (I/O) assemblies and related structural components of portable electronic devices. As camera modules of portable electronic devices become increasingly sophisticated, the camera modules are often paired with strobe modules to improve the image quality. Embodiments described herein provide exemplary architecture that can provide compact and efficient ways to combine camera modules, strobe modules, and potentially other input/output components such as microphones in a single I/O assembly. Exemplary architecture also improves image quality of the camera modules by optically isolating light emitted from a strobe module from leaking into the camera modules.

In accordance with some embodiments, an exemplary input/output (I/O) assembly can include optical components and audio components. For example, the I/O assembly can include an audio transducer that can detect and respond to sound (e.g., a microphone) and/or that can convert electrical signals to sound (e.g. a speaker). The I/O assembly can also include a first camera module and a second camera module. In one case, the two camera modules can both be positioned with a single housing and controlled by a circuit board carried within the camera module housing. The circuit board can include light sensors, analog-to-digital convertors, and processor integrated circuits that can control the camera modules and process the images and videos captured by the camera modules. The two camera modules can each include lens, shutters, apertures, and other components of a camera. The two camera modules can have different optical properties such as different ranges of focal length to compensate each other. A strobe module that can be carried by a flex connector (i.e. a flexible circuit connector) that can be positioned on a top surface of the camera module housing at a location that is between the first and second camera modules. The audio transducer can be positioned adjacent to the strobe module. The same flex connector can be electrically coupled to the strobe module and the audio transducer.

The I/O assembly can include an opaque structural element that can serve as an enclosure to enclose and optically isolate the camera modules and the strobe module. In one case, the enclosure can be referred to as a trim. Light emitted from the strobe module could potential leak to the camera modules or the light sensor on the circuit board from inside of the I/O assembly or from outside of the I/O assembly, for example, by reflection. The trim can serve to block both internal and external leakages. From inside of the I/O assembly, the trim can include internal walls that can define one or more chambers at which the camera modules and the strobe module can be positioned. The internal walls can block light from reaching the camera modules or the light sensors. A boot member, which can be formed from a compression-molded material, can fill the space between the strobe module and the top surface of the camera module housing so that the strobe can be completely optically isolated from the camera modules internally. From outside of the I/O assembly, the cover glass for the camera modules and the strobe window can be two separate pieces. The cover glass for the camera modules can include a physical opening for the strobe window to be positioned therein. The trim can include a lip that can engage with the internal edge of the opening of the cover glass. By separating the camera cover glass and the strobe window, the lip can serve as a wall that optically block the strobe's light from entering the camera cover glass and being reflected to the camera modules.

Also, architecture for securing an I/O assembly to the enclosure of a portable electronic device is described. The enclosure of an exemplary portable electronic device can include a side wall retainer that defines the perimeter of the portable electronic device, a front wall, and a back wall. The side wall retainer and the walls can cooperate to define the enclosure and the cavity within the enclosure. In some cases, one or both of the protective layers can take the form of sapphire cover glasses. To provide a secured and also aesthetically pleasing way to couple the I/O assembly to the enclosure, the I/O assembly can slightly protrude from a rear exterior surface of the portable electronic device so that the I/O assembly can be proud of both the exterior and interior surface of the back wall. In addition, the I/O assembly can be secured to the enclosure both from outside of the back wall and from inside of the back wall. From outside of the back wall, the proud portion of the I/O assembly can be surrounded by and adhered to a turret. The turret can be secured to the exterior surface of the back wall. The turret can provide a smooth transition from the back wall to the proud I/O assembly, thereby serving both structural and cosmetic purposes.

From inside of the back wall, the camera module housing can be mounted on a cowling, which in turn can be secured to a structural element of the portable electronic device such as an extension or a portion of the enclosure of the portable electronic device. The trim, which may surround the camera module, can be secured to a brace piece. The brace piece, which can be a structural element that can be formed from a high strength material such as a metal, can be secured to the side wall retainer of the enclosure of the portable electronic device. By attaching the I/O assembly to different parts of the enclosure of the portable electronic device from different locations, the I/O assembly can be securely mounted on and be protected by the enclosure.

These and other embodiments are discussed below with reference to FIGS. 1A-12; however, those skilled in the art will readily appreciate that the detailed description given herein with respect to these figures is for explanatory purposes only and should not be construed as limiting.

Figure 1B:
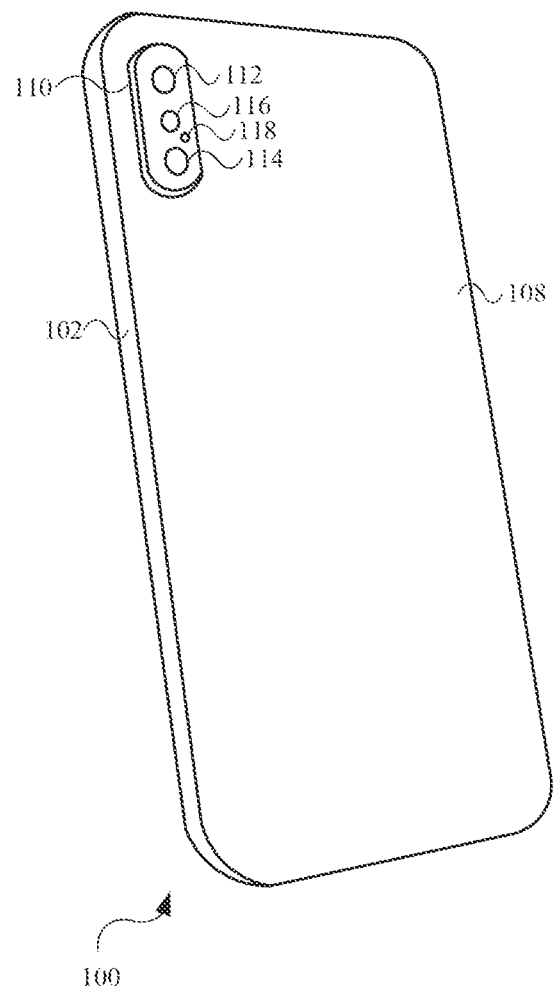
FIG. 1B is a rear perspective view of the portable electronic device shown in FIG. 1A.

Referring to FIGS. 1A and 1B, a front perspective view and a rear perspective view of an exemplary portable electronic device 100 in accordance with some embodiments are respectively illustrated. Portable electronic device 100 can be a mobile communication device such as a smartphone and/or a tablet device. Portable electronic device 100 may vary in size and shape. In the embodiment shown in FIGS. 1A and 1B, portable electronic device 100 can take the form of a smartphone.

Portable electronic device 100 can include a side wall retainer 102 that can define the perimeter of portable electronic device 100. Side wall retainer 102 can provide structural support and protection to portable electronic device 100. Side wall retainer 102 can sometimes also be referred to as a frame or a band piece. Side wall retainer 102 can be formed from a high strength material such as stainless steel, aluminum, and/or an alloy that includes aluminum. However, other materials are also possible, such as a high strength plastic or ceramic. Portable electronic device 100 can also include, on a front surface, a display assembly 104 designed to present visual content. Display assembly 104 can be mounted on side wall retainer 102. In some embodiments, display assembly 104 can includes a touch sensitive layer designed to receive touch inputs from users and generate commands, in accordance with the touch inputs, to a processor circuit (not shown) of portable electronic device 100. A front wall 106 can overlie and cover display assembly 104. In some cases, front wall 106 can cover the entire front surface of portable electronic device 100 and can cooperate with side wall retainer 102 to form a part of an enclosure of portable electronic device 100. Front wall 106 can be formed from a transparent material, such as glass or sapphire including sapphire glass, so that the visual content of display assembly 104 is visible through front wall 106. Hence, front wall 106 can sometimes also be referred to as front cover glass 106, even though front cover glass 106 can be formed from other transparent material. In some embodiments, portable electronic device 100 can also include a force detection sensor (not shown) designed to detect an amount of force applied to display assembly 104 and/or front cover glass 106. The amount of force detected may be received by a processor circuit of portable electronic device 100, in order to generate a command or input based on the amount of force.

On its rear surface as shown in FIG. 1B, portable electronic device 100 can include a back wall 108 that can engage with side wall retainer 102 of portable electronic device 100. In other words, back wall 108 can define the rear surface of portable electronic device 100. Back wall 108 can be formed from any high strength materials including a material that is the same as the material of side wall retainer 102 or a different material. In some embodiments, back wall 108 can be formed from light passing materials such as glass or sapphire. Hence, back wall 108 can sometimes be referred to as rear cover glass 108. In some cases, rear cover glass 108 may be dyed or coated with the same color of side wall retainer 102 to give a coherent and aesthetic appearance to portable electronic device 100. Also, rear cover glass 108 may be dyed or coated with opaque materials so that rear cover glass 108 is no longer transparent. Material such as sapphire can be used as the rear cover glass 108 to enable wireless charging such as through the wireless charging standard Qi. Side wall retainer 102, front cover glass 106 and rear cover glass 108 can cooperatively form the enclosure that defines a cavity of portable electronic device 100 in which internal components and circuitry (not shown) are carried.

On its rear surface, portable electronic device 100 can also include an input/output (I/O) assembly 110, which can be proud of the rear surface of portable electronic device 100. In one case, I/O assembly can perform various imaging and/or audio operations such as taking photos and recording videos and sound clips for portable electronic device 100. In some embodiments, I/O assembly 110 can include a single camera module. In other embodiments, I/O assembly 110 can include multiple optical and audio components. For example, in the particular embodiment shown in FIG. 1B, I/O assembly 110 can be a dual-camera assembly that can include a first camera module 112, a second camera module 114, and a strobe module 116 that can provide flash light for the camera modules or for other purposes such as being used as a torch. First and second camera modules 112 and 114 can also sometimes be referred to as rear cameras or rear camera modules because the modules can be located on the rear surface of portable electronic device 100. Strobe module 116 can be positioned collinear with the first camera module 112 and the second camera module 114 and also between the first camera module 112 and the second camera module 114. In some embodiments, I/O assembly 110 can also include an opening 118 for access of an audio transducer such as a microphone (not shown in FIG. 1B) carried in I/O assembly 110.

Portable electronic device 100 can include additional input/output interfaces, sensors, switches, terminals, and/or ports. In the embodiment shown in FIG. 1A, portable electronic device 100 can include interface panel 120 can that include one or more input/output interfaces, sensors, switches, terminals, and/or ports. Interface panel 120 can include components such as infrared facial recognition emitters and sensors, proximity sensors, loudspeakers, microphones, front camera modules, wireless charging interfaces and/or other suitable components. It should be noted that those components could also be located separately in other suitable locations of portable electronic device 100.

Figure 2:
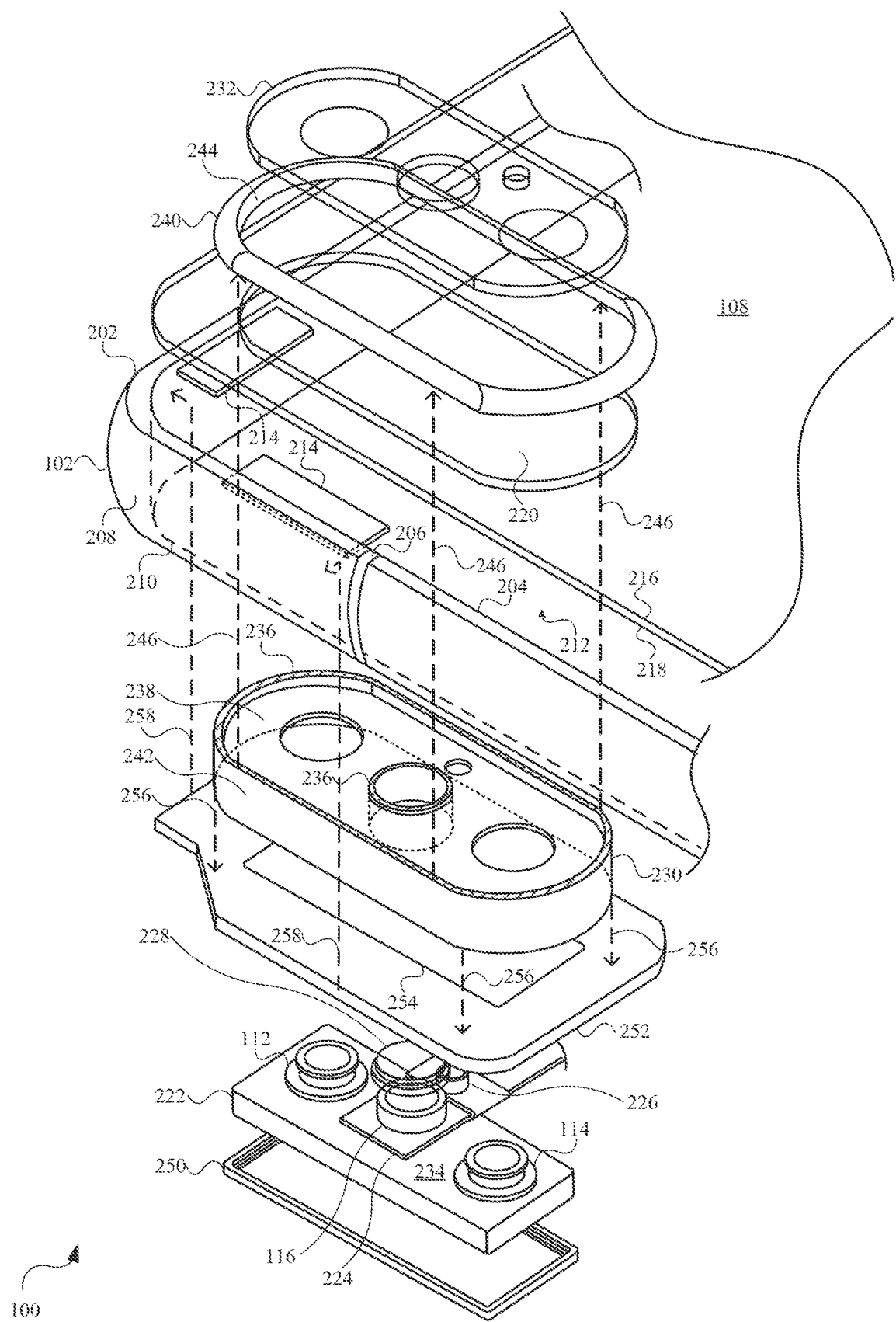
FIG. 2 is an exploded view of a portion of a portable electronic device and an I/O assembly in accordance with some embodiments.
Figure 3:
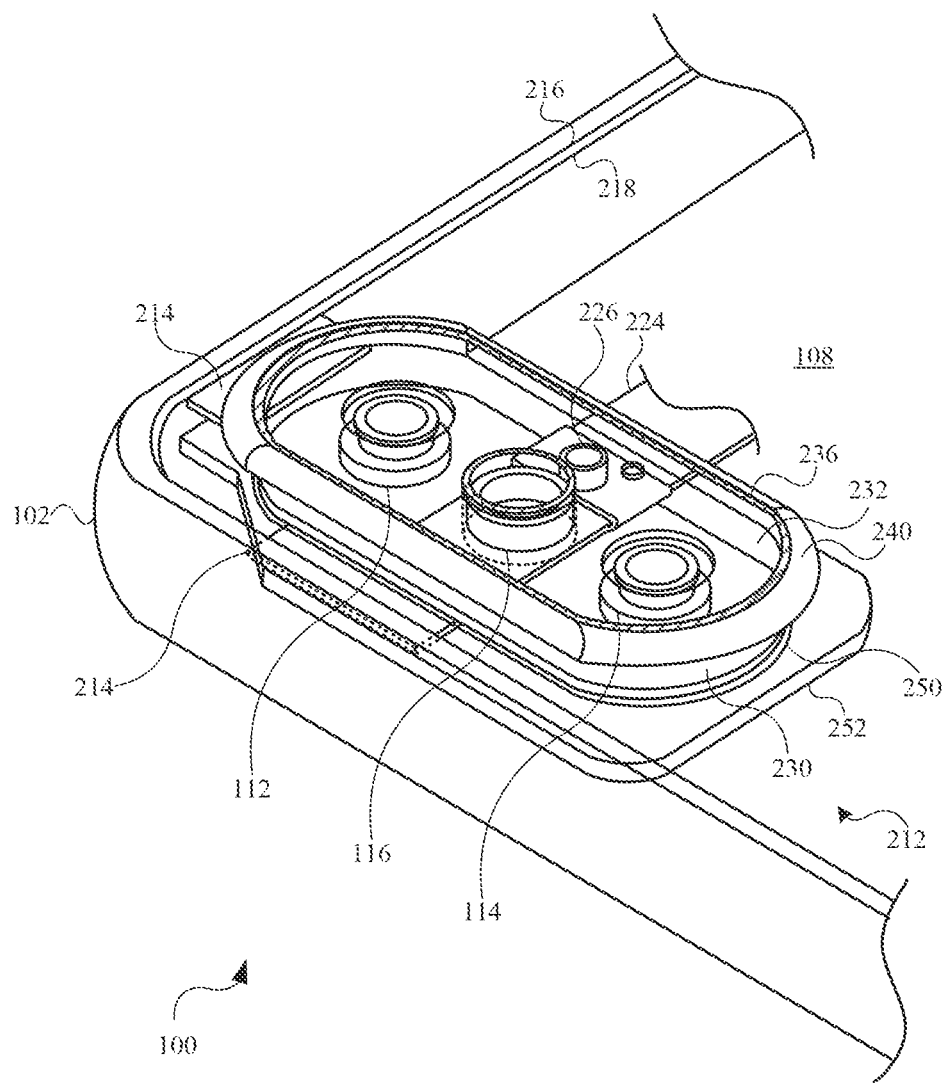
FIG. 3 is a see-through view of a portion of a portable electronic device and an I/O assembly in accordance with some embodiments.

FIGS. 2 and 3 illustrate detailed structure and components of I/O assembly 110 in accordance with some embodiments. FIG. 2 illustrates, from the rear surface of portable electronic device 100, an exploded view of I/O assembly 110 and nearby structural and/or cosmetic elements. FIG. 3 illustrates a see-through view of I/O assembly 110 from the rear surface of portable electronic device 100 when I/O assembly 110 is assembled. It should be noted that front cover glass 106, display assembly 104 and other internal components such as main logic board of portable electronic device 100 are not shown in FIG. 2 or FIG. 3.

With reference to both FIGS. 2 and 3, portable electronic device 100 can include side wall retainer 102 which can be a ring shaped structure that can define the perimeter of portable electronic device 100. In the partial view of FIG. 2, an L-shaped portion of side wall retainer 102 is shown. In some cases, side wall retainer 102 can be formed from a metal such as an aluminum alloy or stainless steel. Side wall retainer 102 can be a unitary piece or can be formed with multiple parts secured together. In the particular embodiment shown in FIG. 2, side wall retainer 102 can include a first part 202, a second part 204, and a split 206 that can be formed from an electrical insulator such as an injection-molded polymer. Split 206 can electrically isolate first part 202 and second part 204 so that first part 202 and second part 204 can serve different purposes in addition to their structural function. For example, first part 202 and second part 204 can serve as or be connected to different antennas for portable electronic device 100 to receive wireless signals in different frequency ranges.

Side wall retainer 102 can be characterized as having an exterior surface 208 that can serve as part of the exterior surface of portable electronic device 100 and having an interior surface 210 that can partially define the internal cavity 212 of portable electronic device 100. In FIG. 2, part of the interior surface 210 that is behind exterior surface 208 is illustrated in dashed lines. Interior surface 210 can be the mounting surface of side wall retainer 102 on which various structural components and other components are mounted. Side wall retainer 102 can also include one or more ledges 214 that can serve as structural elements for supporting and connecting one or more components. Ledges 214 can be extended from interior surface 210 of side wall retainer 102 internally towards internal cavity 212. In some cases, ledges 214 can be integrally formed with side wall retainer 102. In other cases, ledges 214 can be separate structural elements that are secured to side wall retainer 102. For example, in one case, a ledge 214 can be an L-shaped support plate that is mounted on interior surface 210 by one or more fastening mechanism such as screws, welding, and/or adhesives.

Above side wall retainer 102 (from the perspective of FIGS. 2 and 3), portable electronic device 100 can include a piece of rear cover glass 108 that can define the rear surface of portable electronic device 100. While in FIGS. 2 and 3 rear cover glass 108 is shown as transparent, in some embodiments rear cover glass 108 is dyed or coated with colored materials so that rear cover glass 108 can be opaque. Rear cover glass 108 can include an exterior surface 216 that can serve as the rear surface of portable electronic device 100 and an interior surface 218 that can partially define cavity 212 of portable electronic device 100. Near one of its corner, rear cover glass 108 can include an opening 220 at which I/O assembly 110 can be positioned. Rear cover glass 108 can be secured to side wall retainer 102 and be supported by one or more ledges 214, as shown in FIG. 3.

I/O assembly 110 can include camera modules that are carried by a camera module housing 222. I/O assembly 110 can also include a flex connector 224 that can carry a strobe module 116 and an audio transducer 226. I/O assembly 110 can further include a strobe window 228, a trim 230, a camera cover glass 232, and other components that will be discussed in further detail. In one case, audio transducer 226 can be a microphone that can detect and convert audible signals into electrical signals. In other cases, audio transducer 226 can be a loudspeaker or any other suitable acoustic devices that can transmit or receive audible signals. In the embodiment shown in FIG. 2, a single camera module housing 222 can carry both a first camera module 112 and a second camera module 114. However, it should be understood that the two camera modules could also be carried by separate housings. Camera module housing 222 can carry a circuit board (not shown) that can include light sensors, analog-to-digital convertors, and processor integrated circuits that can control first camera module 112 and second camera module 114. Alternatively, each camera module can also include its own circuit board. First camera module 112 and second camera module 114 can respectively include lens, shutters, apertures, and other components of a camera and portion of the modules can extend out of camera module housing 222. In some cases, both camera modules 112 and 114 can be identical and be used to compensate each other. In other cases, the camera modules can have different optical properties. For example, first camera module 112 can have a first range of length and second camera module 114 can have a second range of focal length that is different than the first range of focal length. For example, first camera module 112 can be a wide-angle camera with a relatively short focal length while second camera module 114 can be a telephoto camera that provides a long range optical zoom. In order to reduce the thickness of portable electronic device 100 (i.e. the height of side wall retainer 102), camera module housing 222 can be thin but have a relatively large surface area 234.

Because camera module housing 222 can have a relatively large surface area 234, first camera module 112 and second camera module 114 can be spaced apart by a relatively large distance. The separation can provide sufficient space for strobe module 116 to fit between first camera module 112 and second camera module 114. In one case, strobe module 116 can also be collinear with first camera module 112 and second camera module 114. Flex connector 224 can carry strobe module 116 and be connected either or both to a main logic board (not shown) of portable electronic device and to the circuit board of the camera modules so that the circuit board can directly control strobe module 116. The relatively large surface area 234 can also allow audio transducer 226 to be positioned thereon. In one embodiment, audio transducer 226 can also be carried by flex connector 224. Since audio transducer 226 can be positioned near the rear surface of portable electronic device 100, audio transducer 226 can mainly serve to record sound for camera module housing 222 when one of the camera modules is recording a video. Flex connector 224, carrying both strobe module 116 and audio transducer 226, can be positioned on top of the top surface of camera module housing 222. Flex connector 224 can be folded in a manner that will be discussed in further detail below. The folding can add space occupied by flex connector 224 to help the sealing and positioning of strobe module 116 and audio transducer 226.

I/O assembly 110 can also include a trim 230 that can enclose first camera module 112, second camera module 114, and strobe module 116. Trim 230 can take the shape of a deep drawn bucket that can include internal walls and chambers that can optically blocks light emitted from strobe module 116 from leaking to any of the first camera module 112 or the second camera module 114. Hence, in some cases, trim 230 can also be referred to as a light blocking trim. In FIG. 2, some of the exemplary walls and chambers are illustrated in dashed lines. Trim 230 can also include one or more openings that provide access to first camera module 112, second camera module 114, strobe module 116, and audio transducer 226. Detailed structure and features of trim 230 will be further discussed below.

Trim 230 can serve multiple purposes. First, trim 230 can serve as a structural component that can help I/O assembly 110 to be secured to some structural elements (such as side wall retainer 102 and rear cover glass 108) of portable electronic device 100. For example, trim 230 can be formed from a high strength material such as stainless steel or other another suitable metal, alloy, or high strength polymer. Trim 230 can also support other components of I/O assembly 110. For example, trim 230 can have lips 236 (shaded) that can define a receptacle 238 that can receive camera cover glass 232. Receptacle 238 can have a size and shape that is complementary to camera cover glass 232 so that camera cover glass 232 can fit right at receptacle 238. Trim 230 can further serve as a divider that can divide first camera module 112, second camera module 114, and strobe module 116 so that light emitted from strobe is not leaked to the camera modules. In some cases, trim 230 can be coated with an opaque and non-reflective material. In one case, the internal surface (or the entire trim 230) of trim 230 can be coated with a diamond-like carbon coating with non-reflective surface texturing. Trim 230 can additionally serve cosmetic purpose. Certain exposed edges or surface of trim 230 (such as lips 236 shaded in FIGS. 2 and 3) can have a shiny finish so that, when I/O assembly 110 is assembled, trim 230 can give an aesthetically pleasing outline (best shown in FIG. 3) to I/O assembly 110.

I/O assembly 110 can also include camera cover glass 232. Camera cover glass 232 can be formed from a transparent material. In one case, camera cover glass 232 is formed from sapphire. However, one of its surfaces can be dyed or coated with black mass or other suitable opaque materials in a manner that will be discussed in further detail below. Camera cover glass can overlie trim 230 and can include one or more openings and/or windows that allow access to camera modules 112 and 114 and strobe module 116.

FIG. 2 also illustrates an exemplary architecture of how I/O assembly 110 can be secured to the enclosure of portable electronic device 100. In some embodiments, I/O assembly 110 can be secured to the enclosure from both outside of the exterior surface 216 of rear cover glass 108 and inside of the interior surface 218 of rear cover glass 108. FIG. 2 shows multiple dashed lined arrows that can represent how components of I/O assembly 110 are secured to different part of the enclosure of portable electronic device 100.

I/O assembly 110 can be positioned at opening 220 of rear cover glass 108. I/O assembly 110 can be suspended at opening 220 such that a portion of I/O assembly 110 protrudes from exterior surface 216 and is proud of exterior surface 216 while another portion of I/O assembly 110 can remain in cavity 212 (best shown in FIGS. 3 & 6B). From outside of exterior surface 216, trim 230 of I/O assembly 110 can be secured to a turret 240. In one embodiment, turret 240 can take the form of a ring that has a shape of the perimeter of trim 230. Turret 240 can serve both structural and cosmetic purposes. In terms of its structural purpose, a portion of side surface 242 of trim 230 can be secured to internal side surface 244 of turret 240 through adhesive and/or welding, as indicated by arrows 246. Turret 240 can then be secured by adhesive and/or welding to exterior surface 216 of rear cover glass 108 so that I/O assembly 110 can be secured to the enclosure of portable electronic device 100 from outside of exterior surface 216 of rear cover glass 108. Turret 240 can be formed from a high strength material such as stainless steel or any another suitable metal, alloy, or polymer. By surrounding I/O assembly 110, turret 240 can provide mechanical protection to I/O assembly 110. In terms of the cosmetic purpose of turret 240, when I/O assembly 110 is assembled (shown in FIG. 3), the upper edge of turret 240 can be generally flush with lips 236 (shaded) of trim 230 and also be flush with camera cover glass 232. Turret 240 can also be coated with the color of rear cover glass 108 and/or color of camera cover glass 232. Hence, turret 240 can provide a smooth transition from exterior surface 216 of rear cover glass 108 to camera cover glass 232, which is elevated slightly from exterior surface 216.

From inside of interior surface 218 of rear cover glass 108, camera module housing 222 can engage with a retaining member such as a cowling 250. Cowling 250 can be formed by a thin piece of metal or plastic so that cowling 250 can be semi-flexible. In some cases, cowling 250 can be a thin sheet that includes various retention features extending from different locations that can cooperate to retain camera module housing 222. In the particular case shown in FIG. 2, cowling 250 can be a band shaped perimeter cowling that is shaped in accordance with the perimeter of the lower surface of camera module housing 222. Hence, the semi-flexible cowling 250 can engage with camera module housing 222 through frictional fit and/or snap fit. Camera module housing 222 can also optionally be further secured to cowling 250 by adhesives and/or welding. Cowling 250 can in turn be secured to a structural element that is part of, or an extension of, the enclosure of portable electronic device 100.

In addition, trim 230 can be secured to a brace piece 252, which can be a structural element that can have an opening 254 having a size and shape that is complementary to camera module housing 222 so that camera module housing 222 can fit through. The bottom of trim 230 can also be mounted on the top surface of brace piece 252 by adhesives and/or welding, as indicated by dashed lined arrows 256. Brace piece 252 can be secured to enclosure of portable electronic device 100 such as to interior surface 210 of side wall retainer 102 by welding and/or screwing, as illustrated by dashed line arrows 258. Brace piece 252 can also additionally be secured to lower surfaces of ledges 214 by adhesives and/or welding, as shown in FIG. 3. In sum, from outside of exterior surface 216 of rear cover glass 108, trim 230 can be secured to exterior surface 216 through turret 240. From inside of interior surface 218 of rear cover glass 108, trim 230 can be secured to brace piece 252, which can be mounted on interior surface 210 of side wall retainer 102. Camera module housing 222 can be enclosed by trim 230.

Figure 4A:
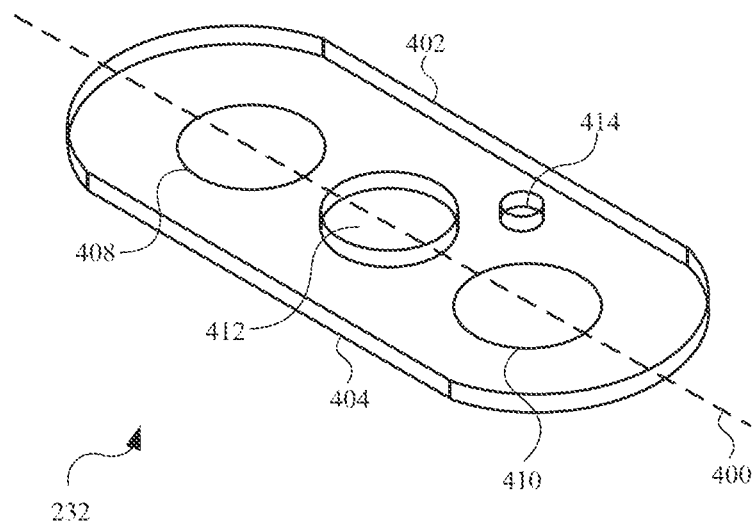
FIG. 4A is a perspective view of a camera cover glass in accordance with some embodiments.
Figure 4B:
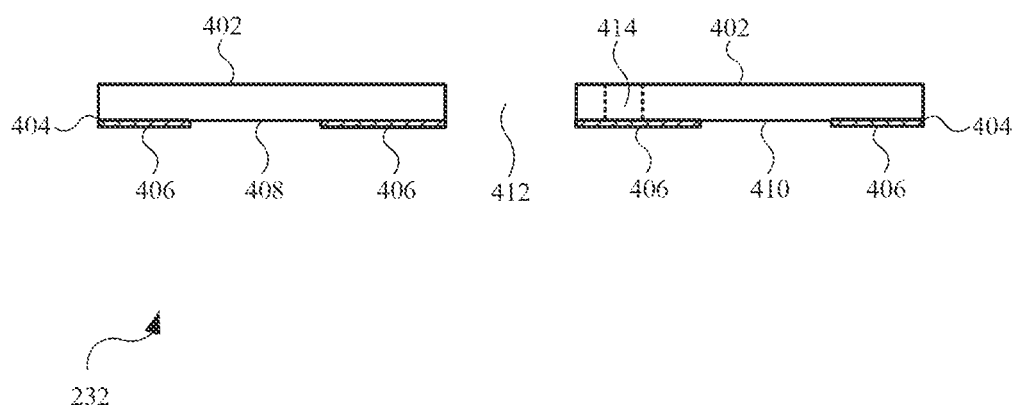
FIG. 4B is a cross-sectional view of the camera cover glass shown in FIG. 4A.

FIGS. 4A and 4B illustrate an exemplary camera cover glass 232 in accordance with some embodiments. FIG. 4A is a perspective view of camera cover glass 232 and FIG. 4B is a cross-sectional view of camera cover glass 232 across dashed line 400. Camera cover glass 232 can be characterized as having an exterior surface 402, which can be an exposed surface of an I/O assembly, and an interior surface 404, which can be adhered to a surface of trim of an I/O assembly. Camera cover glass 232 can be made from a light passing material such as sapphire glass. On interior surface 404, camera cover glass 232 can be dyed or coated with an opaque material 406 (not shown in FIG. 4A but shown in FIG. 4B as shaded elements) such as black mass. Hence, light cannot pass through camera cover glass 232 at location that is dyed or coated with opaque material 406. Camera cover glass 232 can include one or more windows and openings for the access of camera modules, strobes and other component. In the context of camera cover glass 232, windows can refer to locations of camera cover glass 232 that are absent of opaque material 406. Since camera cover glass 232 can be made from a transparent material, light can penetrate through the windows of camera cover glass 232. In the particular embodiment shown in FIG. 4A, camera cover glass 232 can include two camera windows, which can be a first window 408 (a circular window in FIG. 4A) and a second window 410 (another circular window in FIG. 4A) that can respectively correspond to the positions of the first camera module and the second camera module. Windows 408 and 410 are not physical opening of camera cover glass 232, as best illustrated in the cross-sectional view in FIG. 4B. In the context of camera cover glass 232, openings can refer to cavities of camera cover glass 232, as best illustrated in FIG. 4B. For example, camera cover glass 232 can include a first opening 412 that can be positioned collinear with and between first window 408 and second window 410. First opening 412 can correspond to the strobe that can be positioned collinear with and between the first camera and the second camera. Camera cover glass 232 can include a second opening 414, which can serve as an inlet port for an audio transducer of an I/O assembly, which will be explained in further detail below. In sum, a first portion of the camera cover glass 232 that allows passage of light can include first and second camera windows 408 and 410 and opening 412 between the first and second camera windows 408 and 410. A second portion of camera cover glass 232 is coated with opaque material 406 that blocks light from passing through the camera cover glass 232. In one case, the second portion can be all of the remaining of camera cover glass 232 except the first and second camera windows 408 and 410 and the first and second opening 412 and 414.

Figure 5A:
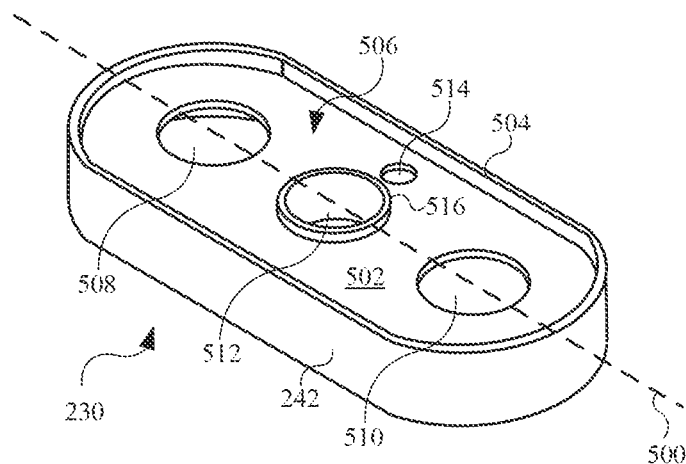
FIG. 5A is a first perspective view of a trim in accordance with some embodiments.
Figure 5B:
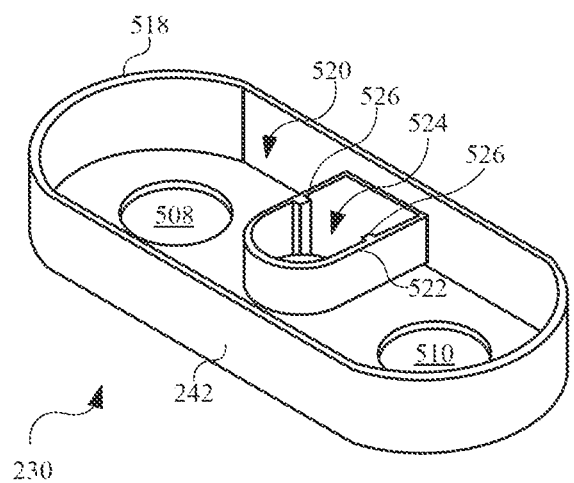
FIG. 5B is a second perspective view of the trim that is inverted compared to FIG. 5A.
Figure 5C:
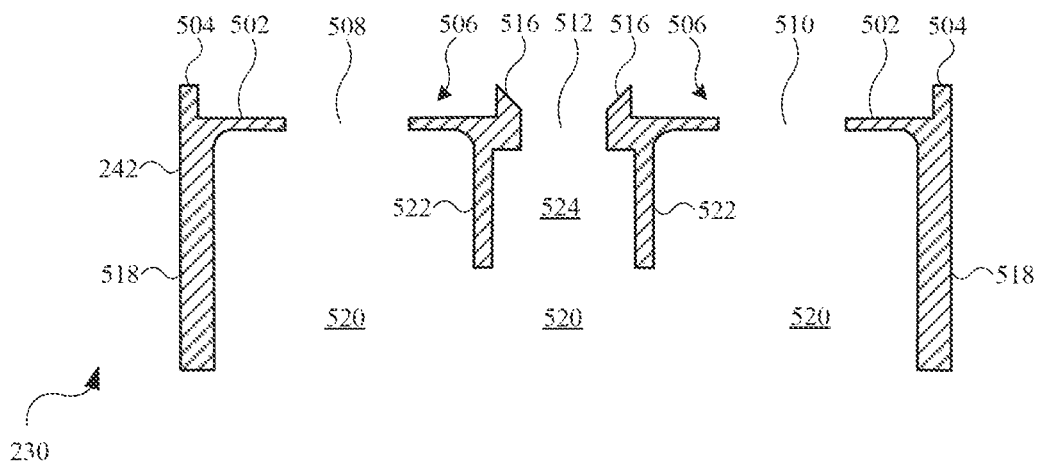
FIG. 5C is a cross-sectional view of the trim shown in FIG. 5A.

FIGS. 5A, 5B, and 5C illustrate an exemplary trim 230 in accordance with some embodiments. FIG. 5A is a first perspective view of trim 230. FIG. 5B is a second perspective view of trim 230 when trim 230 is positioned upside down compared to the configuration in FIG. FIG. 5C is a cross-sectional view of trim 230 across dashed line 500. While a particular exemplary trim 230 is illustrated, it should be understood that trim 230 could take different forms and shapes. In the particular embodiment shown in FIGS. 5A-5C, trim 230 can take the form of a deep drawn bucket that can define an internal volume, as best illustrated in FIG. 5B.

Referring to FIG. 5A, trim 230 can include a surface 502 and a perimeter lip 504 that extends from surface 502 to define a shape of a receptacle 506. Surface 502 can include a first opening 508 and a second opening 510 that provide access to the camera modules that can be enclosed by trim 230. Between the first opening 508 and the second opening 510, there can be a third opening 512 that can provide access to a strobe module. Trim 230 can additionally include a fourth opening 514 that can serve as an inlet opening for an audio transducer. Along the perimeter of third opening 512, there can be a second lip 516 that extends from surface 502. In other words, surface 502 can be recessed from lips 504 and 516. Lips 504 and 516 can cooperate define the shape of receptacle 506, which can have a shape that is complementary to a camera cover glass so that receptacle 506 can receive the camera cover glass. The height of lips 504 and 516 can be generally equal to the thickness of a camera cover glass. Hence, when a camera cover glass is placed on surface 502, surfaces of lips 504 and 516 can be exposed and be flush with the exterior surface of camera cover glass. The exposed surfaces of lips 504 and 516 can serve a cosmetic purpose.

Referring to FIG. 5B, trim 230 can include perimeter wall 518 that can define an internal volume 520. Perimeter wall 518 can be used to enclose the audio and optical components of an I/O assembly such as the camera modules, the strobe module, and the audio transducer (the components are not shown in FIGS. 5A-5C). Trim 230 can also include internal wall 522 that can define one or more internal chamber 524 of trim 230. One exemplary internal chamber 524 can be located between first opening 508 and second opening 510. A strobe module can be positioned within an internal chamber 524 so that internal wall 522 can at least partially block light emitted from the strobe module from leaking into any of the camera modules. Additionally, an audio transducer can also be positioned within internal chamber 524. Internal chamber 524 can include one or more keys 526 that can align the strobe module and the audio transducer.

Figure 6A:
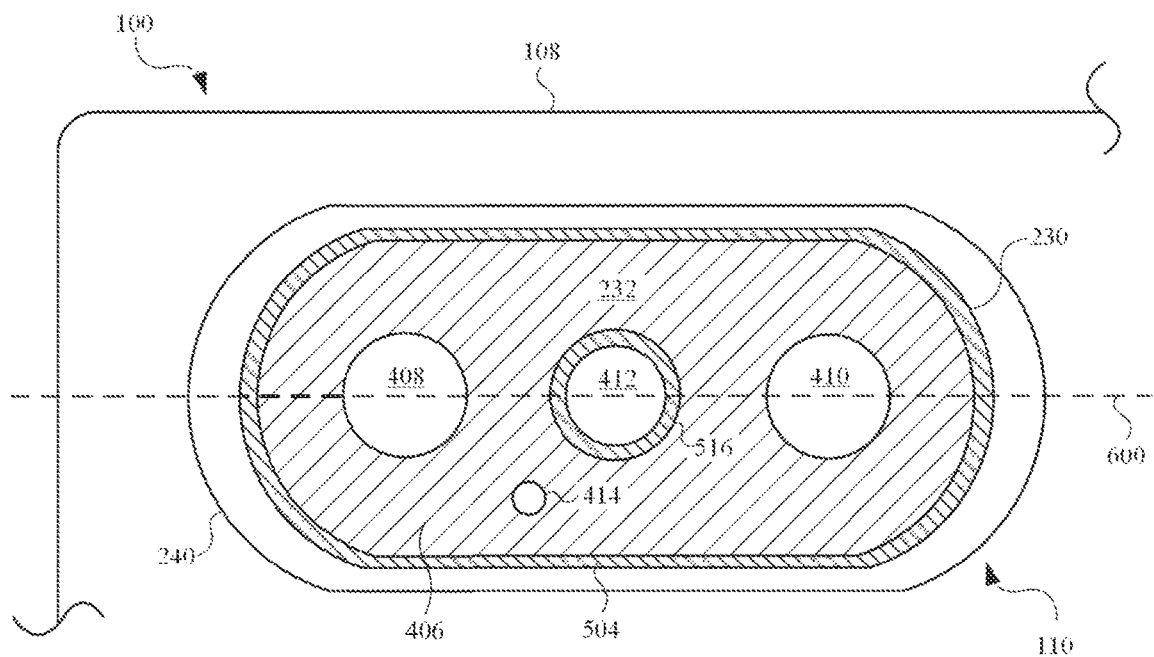
FIG. 6A is a plan view of a portion of a portable electronic device in accordance with some embodiments.

FIG. 6A illustrates a plan view of a portion of a rear surface of portable electronic device 100 at the location of I/O assembly 110. FIG. 6A illustrates rear cover glass 108, exposed surfaces of trim 230 (shaded), turret 240 surrounding perimeter lip 504 of trim 230, and camera cover glass 232 that includes its opaque material 406 (shaded to illustrate the location of opaque material 406). FIG. 6A also shows first window 408, second window 410, first opening 412, and second opening 414 of camera cover glass 232 and second lip 516 (shaded) of trim 230 that is inserted at first opening 412 and surrounds the internal edge of first opening 412.

Figure 6B:
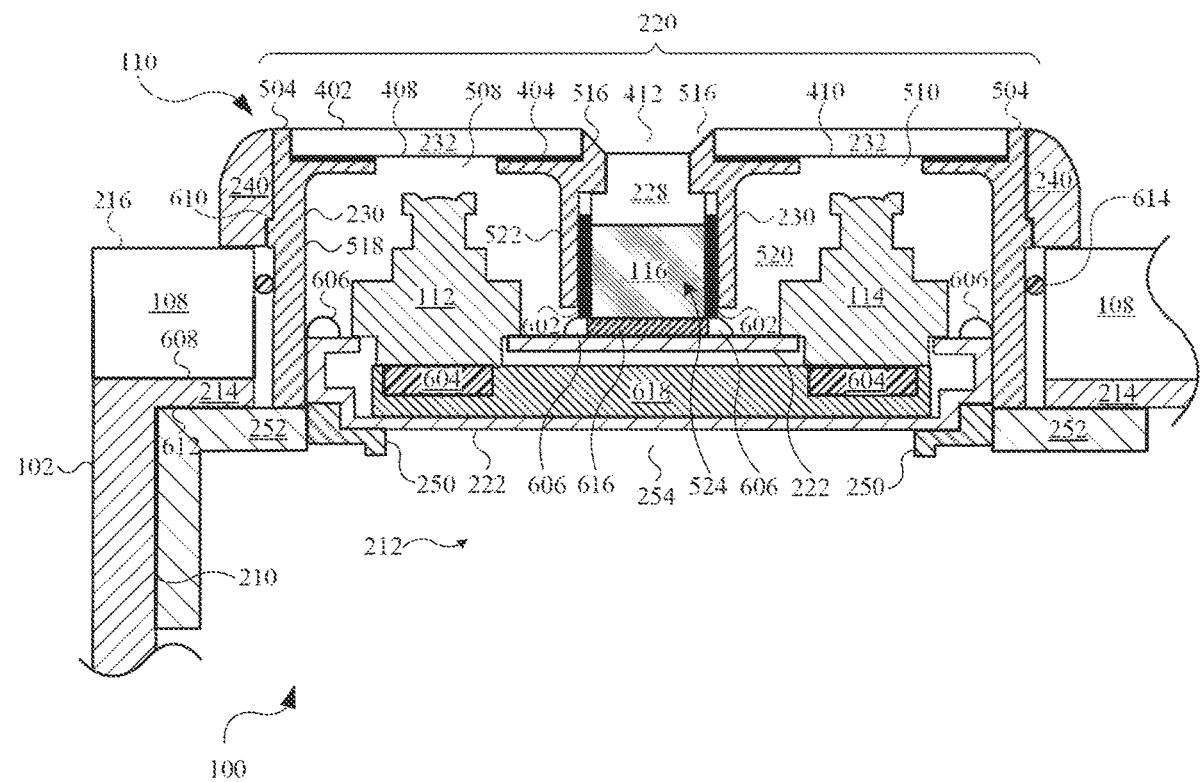
FIG. 6B is a cross-sectional view of the portion of the portable electronic device shown in FIG. 6A.

FIG. 6B illustrates a cross-section view of a portion of portable electronic device 100 along the dashed line 600 in FIG. 6A. For the ease of reference, FIG. 6B is aligned with FIG. 6A. It should be understood that several components, such as rear cover glass 108, camera module housing 222, camera cover glass 232, trim 230, turret 240, cowling 250, and brace piece 252, are illustrated as having separated portions in this cross-section view. This is because those components can have one or more openings and/or can have a ring shaped structure so that each component is divided into more than one portions in this cross-sectional view. For example, comparing FIG. 6B to FIG. 5C, trim 230 can be divided into four pieces in a cross-sectional view because of the several openings present in trim 230.

In FIG. 6B, the cross section of I/O assembly 110 is shown. I/O assembly 110 can include camera module housing 222 that can carry circuit board 618 within the cavity of camera module housing 222. Circuit board 618 can carry first camera module 112 and second camera module 114, which can extend partially outside of camera module housing 222. Camera module housing 222 can be enclosed in the internal volume 520 of trim 230. Trim 230 can receive camera cover glass 232 and secure camera cover glass 232 by adhesives. Lips 504 and 516 can be flush with exterior surface 402 of camera cover glass 232. The opaque material of camera cover glass 232 is represented by thick black horizontal line under interior surface 404 of camera cover glass 232. First window 408 and second window 410 can correspond to locations of camera cover glass 232 that are absent of opaque material. First and second windows 408 can respectively align with first and second camera modules 112 and 114 so that the camera modules can take photos and record video through the windows.

Lip 516 can be inserted into first opening 412 of camera cover glass 232. Underneath lip 516 can be an internal chamber 524 which can be enclosed by internal wall 522 of trim 230. A strobe window 228 can be positioned in internal chamber 524. Interior to strobe window 228, a strobe module 116 can also be positioned in internal chamber 524 above substrate 616 of camera module housing 222 that secures strobe module 116. Strobe window 228 can be positioned slightly interior to camera cover glass 232 and interior to lip 516. By separating strobe window 228 and camera cover glass 232 and by enclosing strobe window 228 with lip 516, light emitted from strobe module 116 can be prevented from entering camera cover glass 232. Lip 516 can internally surround first opening 412 of camera cover glass 232 so that lip 516 can serve as a wall that block light emitted from strobe module 116 from reaching camera cover glass 232 and directly or reflectively leaking into any of first camera module 112 or second camera module 114. Lip 516 can include a chamfered edge that is sloped internally so that the surface of I/O assembly 110 can smoothly transition from the external surface 402 of camera cover glass to the slightly recessed surface of strobe window 228 through the chamfered edge.

Positioning strobe module 116 between first camera module 112 and second camera module 114 can provide significant advantages over conventional placement of a strobe relative to a camera. One design concern of the position of a strobe in a portable electronic device is that light may be leaked or reflected to camera by a part of the portable electronic device. Such unintended leakage or reflection deteriorates the quality of the images because, instead of being reflected by the targeted objects at the focal point, some of the light is reflected by some very nearby objects that can result in glares in the images. Such potential problem can be worsened when the portable electronic device is coupled to an external object, such as a protective case. If the potential reflection of light of the strobe is not taken into account when designing a protective case, the edges of the opening of the protective case for the strobe may reflect the light and deteriorate the quality of the images. Hence, the edge of an opening for the strobe of a case may need special design. A third party manufacturer of protective cases may not be aware of the potential problem and unintentionally design cases that could adversely affect the image quality of a camera. On the contrary, since strobe module 116 is positioned between first camera module 112 and second camera module 114, the area surrounding strobe module 116 is the area that is occupied by first and second camera modules 112 and 114. As a result, the edge of an opening of any protective case that may be coupled to portable electronic device 100 will be quite far away from strobe module 116. Hence, any potential unintentional leakage or reflection of light can be addressed by the design of I/O assembly 110 and the image quality of the camera modules would not be affected by a protective case or any other accessories added to the electronic device.

To further prevent leakage of light from strobe module 116 to any of the camera modules, particularly against internal leakage, a sealing member, which can be referred to as a boot piece 602 can engage with strobe module 116. Boot piece 602 can be a ring shaped structure (hence, shown as two portions in the cross-section view of FIG. 6B) that engages with the perimeter of strobe module 116. Boot piece 602 can be a compression-molded piece that can be formed of an elastic and opaque material. Boot piece 602 can serve multiple purposes. First, it can fill the remaining space of internal chamber 524 so that strobe module 116 can be optically isolated from first and second camera modules 112 and 114. Light emitted from strobe module 116 is prevented from reaching light sensors 604 on circuit board 618. Second, boot piece 602 can also push strobe module 116 and strobe window 228 against trim 230 so that strobe module 116 and strobe window 228 can be secured in placed. Third, boot piece 602 can cooperate with foam 606 presented on selected locations of camera module housing 222 to provide a dust seal to the I/O assembly 110.

Since I/O assembly 110 can be proud of rear cover glass 108, I/O assembly 110 can be particularly susceptible to damage in an accidental drop. Hence, I/O assembly 110 can be secured to the enclosure of portable electronic device 100 from both exterior and interior of portable electronic device 100. Rear cover glass 108 is secured to side wall retainer 102 (shaded) and on a first surface 608 of ledge 214, which can extend from interior surface 210 of side wall retainer 102. Trim 230, which can define the dimension of I/O assembly 110, can have a perimeter that generally correspond to the size and shape of opening 220 of rear cover glass 108 so that I/O assembly 110 can fit through opening 220. Within an acceptable manufacture tolerance range of trim 230 and opening 220, there can be small amount of space between the edge of rear cover glass 108 and trim 230. An O-ring 614 (which is represented by two small circles in this cross-sectional view) that can serve as a gasket can be positioned between trim 230 and an interior edge of opening 220 of rear cover glass 108 to seal the space and to secure trim 230 (therefore I/O assembly 110) in place. Turret 240 can be secured to exterior surface 216 of rear cover glass 108. A portion of side surface of trim 230 can be secured to internal side surface of turret 240 through adhesive and/or welding. Turret 240 can optionally include a stop 610 that can prevent I/O assembly 110 from coming out to the exterior of portable electronic device 100.

From the interior of portable electronic device 100, brace piece 252 can be secured to side wall retainer 102 through welding and/or screwing. Brace piece 252 can additionally be secured to ledge 214 by adhesives and/or welding at a second surface 612 of ledge 214 opposite the first surface 608. I/O assembly 110 can be secured to brace piece 252 by multiple ways. Perimeter cowling 250 can engage with the edge of camera module housing 222 and can fit within opening 254 of the brace piece 252. Perimeter cowling 250 can be used so that only minimal extra thickness is added to the I/O assembly 110 and the supporting structure. Perimeter wall 518 of trim 230 can also be welded onto brace piece 252 so that trim 230, as an enclosure of I/O assembly 110, can be securely mounted on a structural element of portable electronic device 100.

Figure 7:
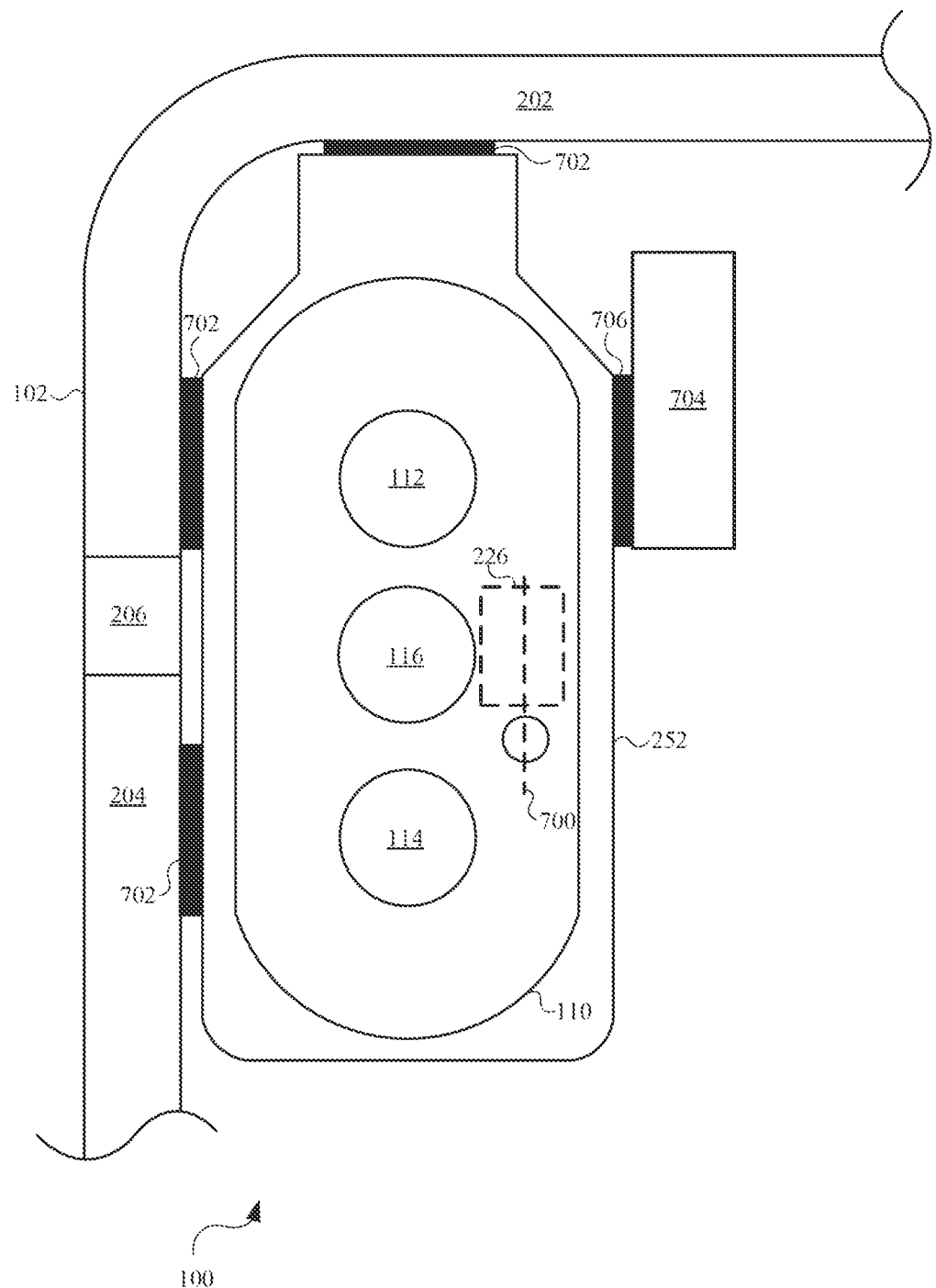
FIG. 7 is an internal plan view of a portion of a portable electronic device in accordance with some embodiments.

FIG. 7 is an internal plan view of portable electronic device 100 illustrating side wall retainer 102 and the position of brace piece 252 and I/O assembly 110 relative to side wall retainer 102. Side wall retainer 102 can include first part 202, second part 204, and a split 206. Brace piece 252 can be secured to side wall retainer 102 at weld points 702. Brace piece 252 can be additionally secured to structural element 704 at weld point 706 to provide more balanced support to brace piece 252. Structural element 704 can be extended from and secured to other structure elements of portable electronic device, such as side wall retainer 102 or another structural element. I/O assembly 110 can be carried by brace piece 252. Since first camera module 112 and second camera module 114 can be spaced apart by a relatively large distance, the space between the two camera modules can fit not only strobe module 116 but also an audio transducer 226 that can be positioned adjacent to strobe module 116.

Figure 8A:
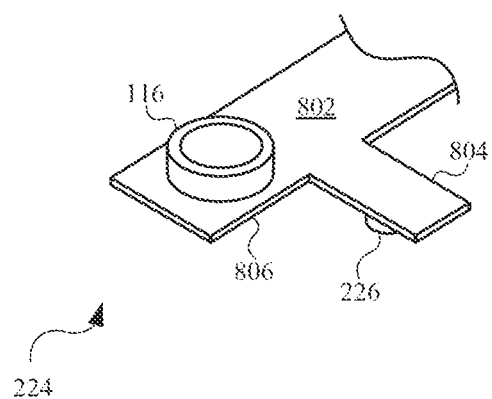
FIGS. 8A and 8B illustrate a flex connector in accordance with some embodiments.
Figure 8B:
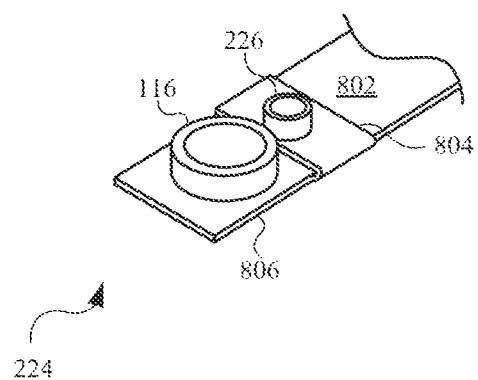

FIGS. 8A and 8B illustrate an exemplary flex connector 224 in accordance with some embodiments. Flex connector 224 can carry strobe module 116 on a first side 802 of flex connector 224 and can include a tail 804 that can carry audio transducer 226 on a second side 806 opposite first side 802. Tail 804 can be folded onto the main part of flex connector 224 so that audio transducer 226 and strobe module 116 can face the same direction, as illustrated in FIG. 8B. This folding structure can help the alignment and positioning of strobe module 116 and audio transducer 226.

Figure 9:
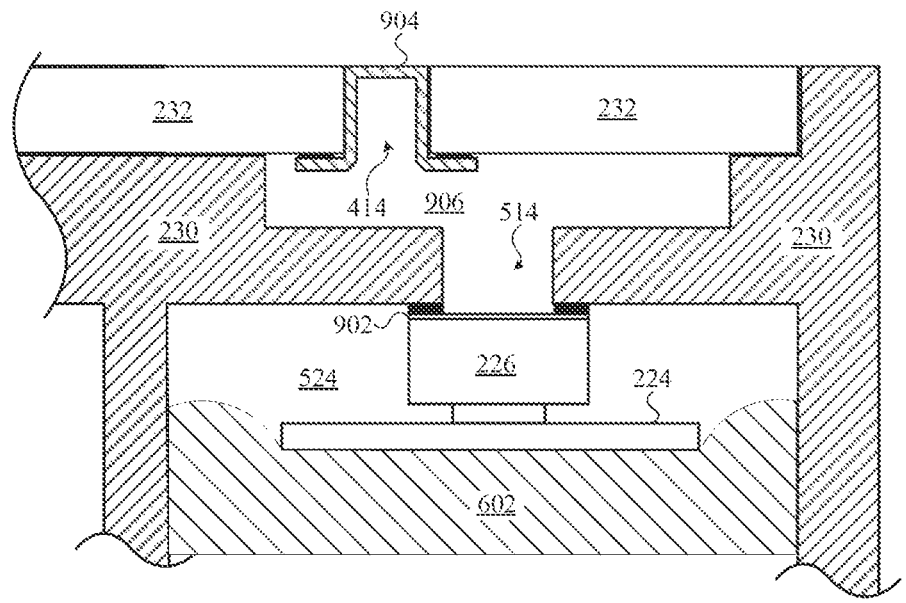
FIG. 9 is a cross-sectional view of a portion of an I/O assembly carrying an audio transducer in accordance with some embodiments.

FIG. 9 illustrates a cross-sectional view of I/O assembly 110 along the dashed line 700 in FIG. 7. I/O assembly 110 can include trim 230 that can include internal chamber 524 that can enclose audio transducer 226. Audio transducer 226 can include a permeable membrane 902. Audio transducer 226 can be carried by flex connector 224 and can also be secured to trim 230 through adhesive. Boot piece 602 can fill some of the remaining space of internal chamber 524 and push audio transducer 226 against trim 230 so that audio transducer 226 can be secured in place. Trim 230 can include fourth opening 514 that can allow sound to pass through trim 230 to reach audio transducer 226. Camera cover glass 232 can include second opening 414 that is protected by mesh 904. Mesh 904 can serve as a dust shield to prevent ingress of dust. To fit in audio transducer 226 to I/O assembly 110 so that the size of I/O assembly 110 and portable electronic device 100 can be reduced, fourth opening 514 of trim 230 and second opening 414 of camera cover glass 232 can be displaced and not be aligned. In addition, such displacement can increase the effective acoustic volume 906 for audio transducer 226.

Figure 10:
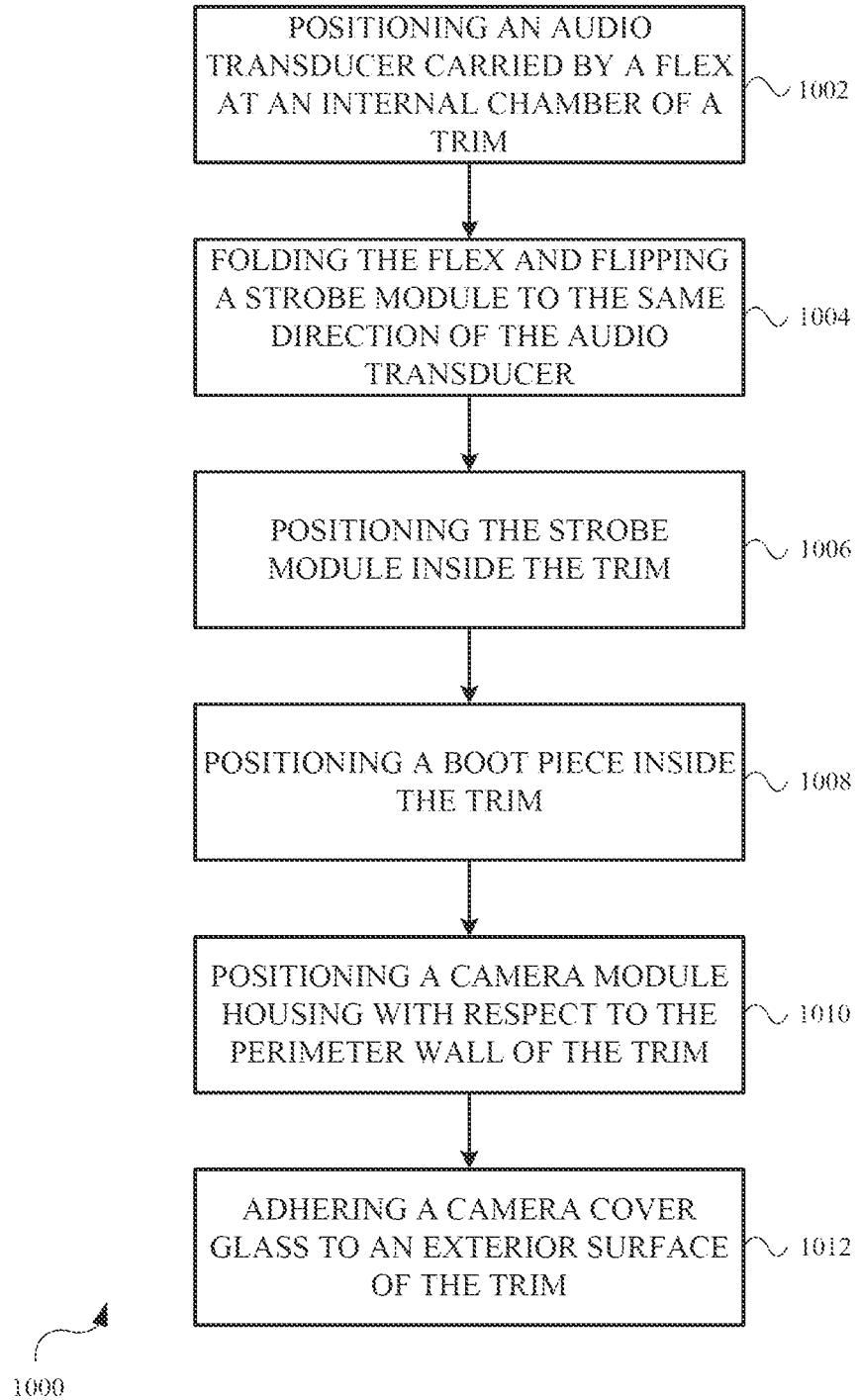
FIG. 10 is a flowchart depicting a method for assembling an I/O assembly in accordance with some embodiments.

FIG. 10 illustrates a flowchart depicting an exemplary method 1000 for assembling an I/O assembly in accordance with some embodiments. Method 1000 can begin at step 1002, which can include positioning and aligning an audio transducer carried by a flex connector at an internal chamber of a trim of the I/O assembly. The flex connector can carry the audio transducer at a tail and a strobe module on an opposite side of the audio transducer. At step 1004, the method can include folding the flex connector and flipping the strobe module to the same direction of the audio transducer. At step 1006, the method can include positioning and aligning the strobe module inside the trim. At step 1008, the method can include positioning a boot piece, which can be formed from a compression-molded material, inside the trim to push the strobe module and audio transducer against the trim and to fill at least some of the remaining space of the internal chamber of the trim. At step 1010, the method can include positioning a camera module housing, which can carry a first camera module and a second camera module, with respect to the perimeter wall of the trim. At step 1012, the method can include adhering a camera cover glass to an exterior surface of the trim at a receptacle defined by the lips of the trim.

Figure 11:
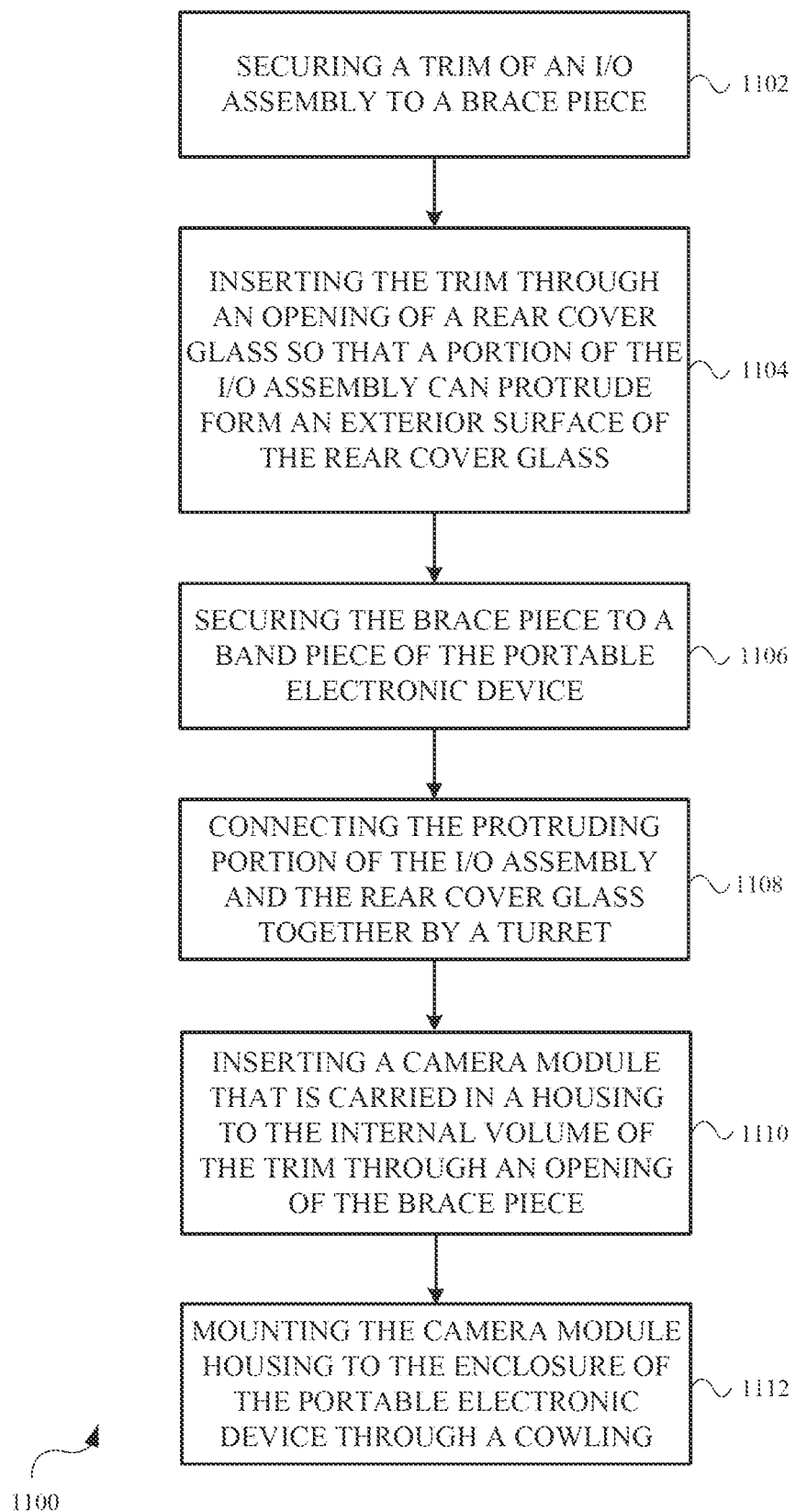
FIG. 11 is a flowchart depicting a method for securing an I/O assembly to an enclosure of a portable electronic device.

FIG. 11 illustrate a flowchart depicting an exemplary method 1100 for securing an I/O assembly to an enclosure of a portable electronic device having a rear cover glass having an opening. Method 1100 can begin at step 1102, which can include securing a trim of the I/O assembly to a brace piece. The securing can include welding the trim to the brace piece or can include other suitable ways. At step 1104, the method can include inserting the trim through the opening of the rear cover glass so that a portion of the I/O assembly can be proud of and protrude from an exterior surface of the rear cover glass and another portion of the I/O assembly can remain interior to the rear cover glass. The brace piece can also be positioned interior to the rear cover glass. In some cases, the trim can be inserted from the interior side of the rear cover glass. At step 1106, the method can include securing the brace piece to the side wall retainer of the portable electronic device. The securing can include the use of welding, screwing, gluing, and other suitable ways. At step 1108, the method can include connecting the portion of the I/O assembly that protrudes from the exterior surface of the rear cover glass and the exterior surface together by a turret that can surround the portion of the I/O assembly. At step 1110, the method can include inserting a camera module that is carried in a camera module housing to the internal volume of the trim through an opening of the brace piece. At step 1112, the method can include mounting the camera module housing to the enclosure of the portable electronic device through a cowling.

It should be understood that the order of some of the steps of method 1000 or method 1100 is not limiting. For example, step 1012 can be performed before or after any other steps.

Figure 12:
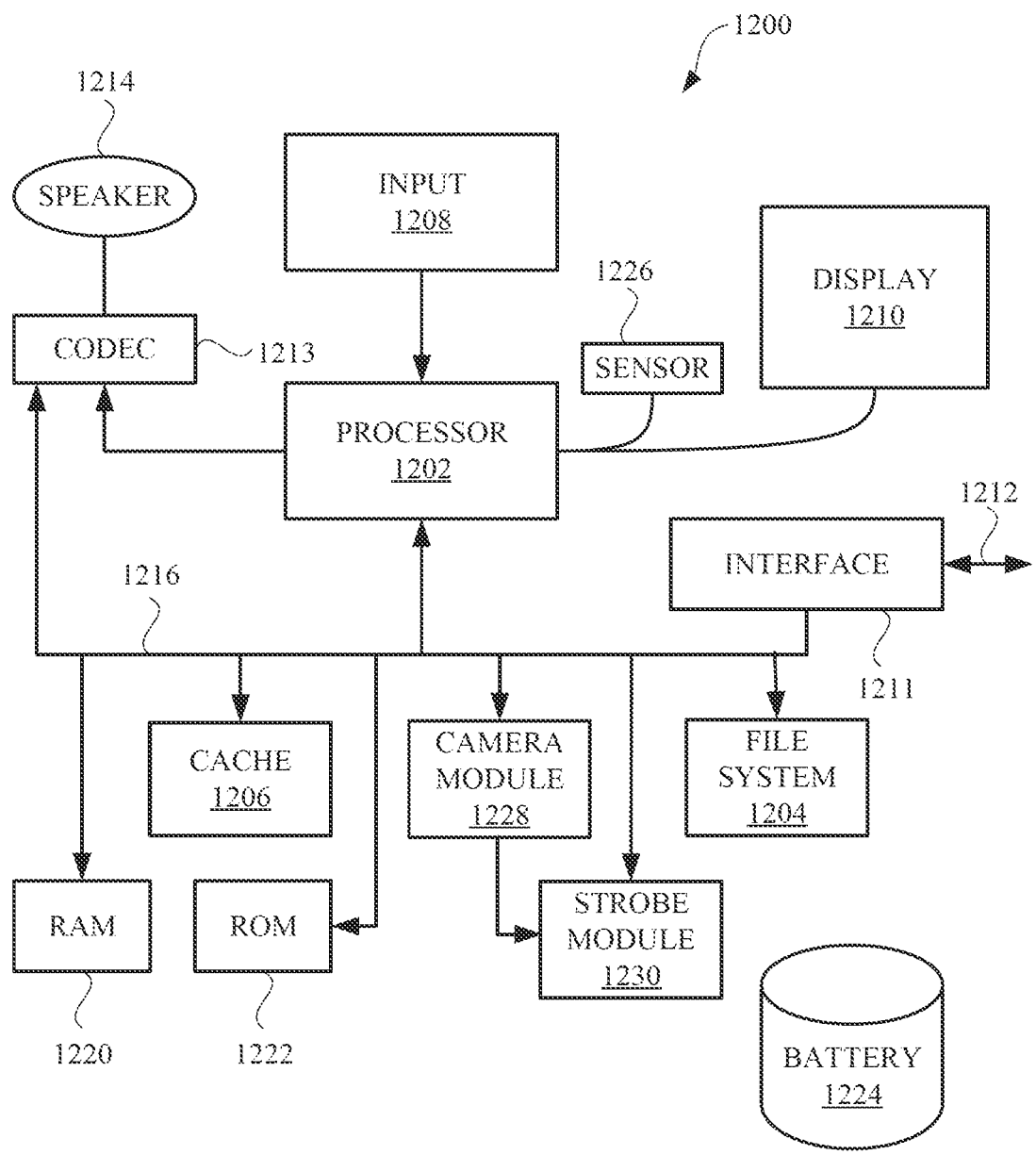
FIG. 12 is a block diagram of a portable electronic device in accordance with some embodiments.

FIG. 12 is a block diagram that illustrates circuitry of a portable electronic device 1200 in accordance with some embodiments. The portable electronic device 1200 can be an electronic device or an article described herein that includes a processor. An exemplary portable electronic device can contain all or some of the components shown in FIG. 12. The portable electronic device 1200 can include a processor 1202 that pertains to a microprocessor or controller for controlling the overall operation of the portable electronic device 1200. The portable electronic device 1200 can store media data pertaining to media items in a file system 1204 and a cache 1206. The file system 1204 can be, typically, a storage disk or a plurality of disks. The file system 1204 typically can provide high capacity storage capability for the portable electronic device 1200. However, since the access time to the file system 1204 can be relatively slow, the portable electronic device 1200 can also include a cache 1206. The cache 1206 can, for example, Random-Access Memory (RAM) provided by semiconductor memory. The relative access time to the cache 1206 can be substantially shorter than for the file system 1204. However, the cache 1206 does not have the large storage capacity of the file system 1204. Further, the file system 1204, when active, can consume more power than does the cache 1206. The power consumption can often be a concern when the portable electronic device 1200 is a portable media device that is powered by a battery 1224. The portable electronic device 1200 can also include a RAM 1220 and a Read-Only Memory (ROM) 1222. The ROM 1222 can store programs, utilities or processes to be executed in a non-volatile manner. The RAM 1220 provides volatile data storage, such as for the cache 1206.

The portable electronic device 1200 can also include a user input device 1208 that allows a user of the portable electronic device 1200 to interact with the portable electronic device 1200. For example, the user input device 1208 can take a variety of forms, such as a button, keypad, touch screen, audio input interface, visual/image capture input interface, input in the form of sensor data, etc. Still further, the portable electronic device 1200 can include a display 1210 (screen display) that can be controlled by the processor 1202 to display information to the user. A data bus 1216 can facilitate data transfer between at least the file system 1204, the cache 1206, the processor 1202, and the CODEC 1213.

In one embodiment, the portable electronic device 1200 can serve to store a plurality of media items (e.g., songs, podcasts, etc.) in the file system 1204. When a user desires to have the electronic device play a particular media item, a list of available media items can be displayed on the display 1210. Then, using the user input device 1208, a user can select one of the available media items. The processor 1202, upon receiving a selection of a particular media item, can supply the media data (e.g., audio file) for the particular media item to a coder/decoder (CODEC) 1213. The CODEC 1213 can then produce analog output signals for a speaker 1214. The speaker 1214 can be a speaker internal to the portable electronic device 1200 or external to the portable electronic device 1200. For example, headphones or earphones that can connect to the portable electronic device 1200 would be considered an external speaker.

The portable electronic device 1200 can also include a network/bus interface 1211 that couples to a data link 1212. The data link 1212 can allow the portable electronic device 1200 to couple to a host computer or to accessory articles. The data link 1212 can be provided over a wired connection or a wireless connection. In the case of a wireless connection, the network/bus interface 1211 can include a wireless transceiver. The media items (media assets) can pertain to one or more different types of media content. In one embodiment, the media items can be audio tracks (e.g., songs, audio books, and podcasts). In another embodiment, the media items can be images (e.g., photos). However, in other embodiments, the media items can be any combination of audio, graphical or visual content. Sensor 1226 can take the form of circuitry for detecting any number of stimuli. For example, sensor 1226 can include a Hall Effect sensor responsive to external magnetic field, an audio sensor, a light sensor such as a photometer, and so on.

The portable electronic device 1200 can further include circuit board 1228 that can be in communication with processor 1202. Circuit board 1228 can control one or more camera modules carried on the circuit board of circuit board 1228. Circuit board 1228 can also process images and/or videos captured by the camera modules and transmit such images and videos in digital format to processor 1202. Circuit board 1228 and/or processor 1202 can also be in communication with strobe module 1230 that provide flash light for the camera modules of circuit board 1228.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
a display assembly capable of presenting visual content;
a front cover overlying the display assembly;
a rear cover defining an opening and an external surface opposite the front cover;
a camera cover glass offset from the rear cover, a first portion of the camera cover glass coated with an opaque material that blocks visible light from passing through the opaque material, and a second portion of the camera cover glass that defines a visible light transparent camera window; and
an input/output (I/O) assembly disposed at least partially between the front cover and the camera cover glass, the I/O assembly comprising:
a first rear camera module positioned in correspondence with the visible light transparent camera window;
a second rear camera module; and
a trim disposed between the rear cover and the camera cover glass, the trim carrying the first rear camera module and the second rear camera module.

2. The electronic device of claim 1, further comprising a sidewall retainer formed from a material different than the front cover and the rear cover, the sidewall retainer coupled with the front cover and the rear cover.

3. The electronic device of claim 1, further comprising a turret surrounding the first rear camera module.

4. The electronic device of claim 1, wherein a second portion of the camera cover glass further defines a visible light transparent strobe window.

5. The electronic device of claim 1, further comprising a turret surrounding the camera cover glass.

6. The electronic device of claim 1, further comprising a turret sealed to the rear cover with an adhesive.

7. The electronic device of claim 1, wherein:
the first rear camera module comprises a first range of focal lengths; and
the second rear camera module comprises a second range of focal lengths different than the first range.

8. An electronic device, comprising:
a front cover;
a rear cover at least partially defining an internal volume, the rear cover comprising:
a first portion defining an aperture and a first exterior surface of the electronic device;
a second portion surrounded by the first portion, the second portion having a shape corresponding to the aperture, the second portion defining a second exterior surface of the electronic device offset from the first exterior surface, the second portion defining a first camera window and a second camera window;
a first rear camera module aligned with the first camera window of the second portion;
a second rear camera module aligned with the second camera window of the second portion; and
a trim disposed in the internal volume between the front cover and the second portion, the trim carrying the first rear camera module and the second rear camera module, the trim surrounding at least one of the first camera window or the second camera window and defining an external surface.

9. The electronic device of claim 8, wherein the first portion and the second portion comprise glass.

10. The electronic device of claim 8, further comprising a frame comprising aluminum.

11. The electronic device of claim 8, wherein the trim comprises metal.

12. The electronic device of claim 8, wherein at least a portion of the second portion is coated with an opaque and non-reflective material.

13. The electronic device of claim 8, wherein the second portion is surrounded by a turret.

14. The electronic device of claim 8, wherein at least one of the first rear camera module or the second rear camera module comprises a wide angle camera.

15. An electronic device, comprising:
a rear cover defining a first portion of an exterior surface and a second portion of an exterior surface, the second portion being proud of the first portion;
a camera window disposed at the second portion, the camera window being coated with an opaque material to define a transparent window;
an input/output (I/O) assembly aligned with the camera window, the I/O assembly comprising a rear camera module aligned with the transparent window; and
a turret that surrounds the camera window between the second portion and the first portion.

16. The electronic device of claim 15, further comprising a trim that holds the rear camera module.

17. The electronic device of claim 15, wherein the camera window comprises transparent portions adjacent to the opaque material, the transparent portions collinear with the rear camera module.

18. The electronic device of claim 15, wherein the second portion comprises glass.

19. The electronic device of claim 15, wherein the rear cover is coated with an opaque material.

20. The electronic device of claim 19, wherein the opaque material is a first opaque material and the camera window is coated with a second opaque material different from the first opaque material.

* * * * *